Nov. 17, 1970 L. ESAKI ET AL 3,541,400

MAGNETIC FIELD CONTROLLED FERROMAGNETIC TUNNELING DEVICE

Filed Oct. 4, 1968 2 Sheets-Sheet 1

INVENTORS
LEO ESAKI
PHILLIP J. STILES
STEPHAN VON MOLNAR

BY Harry M Weiss
ATTORNEY 3,541,400
Patented Nov. 17, 1970

3,541,400

MAGNETIC FIELD CONTROLLED FERROMAGNETIC TUNNELING DEVICE

Leo Esaki, Chappaqua, Phillip J. Stiles, Yorktown Heights, and Stephan von Molnar, Ossining, N.Y., assignors to International Business Machines Corporation, Armonk, N.Y., a corporation of New York Filed Oct. 4, 1968, Ser. No. 765,124
Int. Cl. H01l 3/10
U.S. Cl. 317—231 15 Claims

ABSTRACT OF THE DISCLOSURE

A ferromagnetic device is provided wherein the barrier height presented by the ferromagnetic material of the device is reduced upon application of magnetic fields thereby controlling the current through a thin layer of ferromagnetic material sandwiched between two metallic electrodes. This device is also useful in sensing either the direction or magnitude of a magnetic field applied to the device.

BACKGROUND OF THE DISCLOSURE

In the past, various tunneling devices were made such as the Esaki or tunnel diode, Josephson tunneling device, etc. The Esaki diode utilized two highly doped semiconductor regions of opposite conductivity type connected together by a very small pn junction to form the tunneling device. The Josephson tunneling device is a "sandwich" of a first superconductive metal, an insulator, and a second superconductive metal whereby the insulator serves as a barrier region between the first and second superconductive metals. The insulating material is generally an oxide of the superconductive metal. These and other forms of tunneling devices have the important advantage of being very fast thereby permitting their use in high speed circuits, particularly useful for logic and memory applications.

The disadvantage of using prior art tunneling devices is the cost and time lost in carefully preparing the material needed for the tunneling device. For example, the semiconductor tunneling devices require a high degree of process control in semiconductor diffusion or growth operations to provide the desired high conductivity starting materials for the devices. Similarly, Josephson tunneling devices require a high degree of process control in carefully preparing the high purity superconductive materials needed for the devices. Additionally, in the use of Josephson tunneling devices, magnetic fields that were applied to these devices had to be be very carefully oriented so as to provide the desired effect that was needed to operate these devices.

Accordingly, it is an object of this invention to provide an improved ferromagnetic device or apparatus.

It is another object of this invention to provide a ferromagnetic device capable of providing a change in current upon application of a magnetic field.

It is still a further object of this invention to provide a tunneling type of device which utilizes metal electrodes of any desired type.

It is another object of this invention to provide a tunneling type ferromagnetic device which can be operated by magnetic fields applied in any direction to the tunneling type current of the device.

It is a still further object of this invention to provide a metal-ferromagnetic-metal tunneling type device which is controllable by magnetic fields applied in more than one direction.

It is still another object of this invention to provide a device for sensing either the magnitude or direction of a magnetic field.

In accordance with one embodiment of this invention a ferromagnetic device is provided which comprises a first metal electrode, a second metal electrode, and a thin layer of ferromagnetic material located between and in contact with the first and second metal electrodes. Magnetic fields are applied to the tunneling device to vary or control the barrier height of the ferromagnetic insulating film thereby controlling the magnitude of the current through the device. The magnetic fields that are applied to the tunneling device are applied in any direction and preferably applied perpendicular to the direction of current. The ferromagnetic insulating film is a thin film in the range of about 50 to 2000 A. in thickness of any desired ferromagnetic material. For example, any one or combinations of the four europium chalcogenides EuS, EuSe, EuO, and EuTe, which are ferromagnetic materials can be used in the device or apparatus of this invention. EuSe and EuS, two of the europium chalcogenides are particularly useful as the ferromagnetic material for the device of this invention. A positive potential is applied to the first metal electrode and a negative potential is applied to the second metal electrode to establish a current flow through the device.

In accordance with another embodiment of this invention, a magnetic field direction sensing and magnitude sensing apparatus is provided. The apparatus comprises first and second metal conductors or electrodes and a ferromagnetic insulator located between the first and second metal conductors. The ferromagnetic material is capable of exhibiting conductivity changes when subjected to a magnetic field. Means in the form of a voltage source are provided for applying a positive potential to the first metal conductor and a negative potential to the second metal conductor. Means in the form of an ammeter are provided to sense changes in current through the ferromagnetic insulator depending upon the magnitude and direction of the magnetic field.

The foregoing and other objects, features and advantages of the invention will be apparent from the following more particular description of the preferred embodiment of the invention, as illustrated in the accompanying drawings.

BRIEF DESCRIPTION OF THE DRAWINGS

Referring to FIG. 1, the ferromagnetic device of this invention is made up of a first electrode which is located on a substrate 2, of for example, sapphire or any other suitable material. The first metal electrode 1 is of any desired metal material that can be evaporated or deposited onto the substrate and which, preferably, can be heated to effect better mechanical connection between the first metal electrode 1 and the substrate 2. A ferromagnetic insulating film 3 is deposited on the first metal electrode 1 by evaporation or sputtering techniques. In the case of the deposition of the metal electrode 1 by sputtering means, a DC sputtering apparatus is employed whereas RF sputtering apparatus is required to sputter the ferromagnetic insulating film 3 onto the first metal electrode or conductor 1. While any ferromagnetic insulating material can be used for the insulating film or material 3, the four europium chalcogenides EuS, EuSe, EuO, and EuTe have been found to be particularly suitable. In particular, at least one or a combination of the europium chalcogenides are useful as the ferromagnetic material of this device. Preferably, EuSe and/or EuS are especially useful as the ferromagnetic material of this device. The ferromagnetic material or layer 3 has a thickness in the range of about 50–2000 A. and preferably a thickness in the range of from 100–1000 A.

Figure 1:
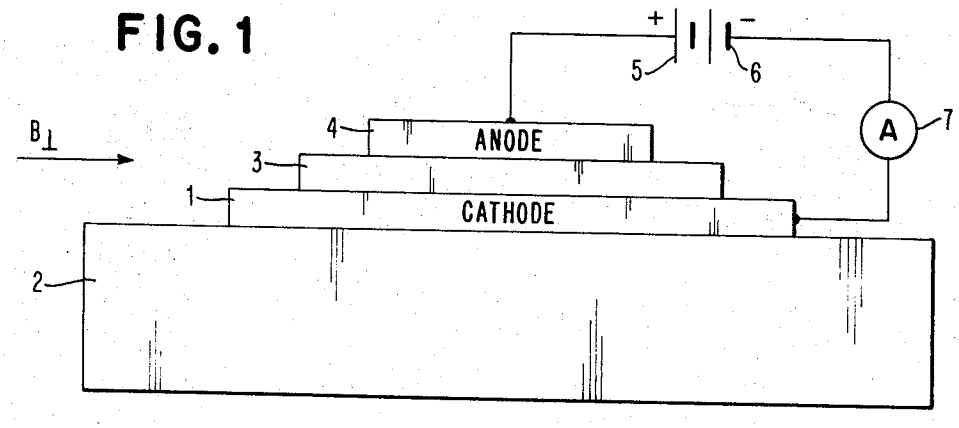
FIG. 1 is a side elevational view of the structural elements of the ferromagnetic device or apparatus of this invention.

A second metal electrode 4 is deposited by evaporation or sputtering techniques onto the ferromagnetic insulating film 3. The second and first metal electrodes 4 and 1 are electrically connected, respectively, to the anode 5 and cathode 6 of a voltage source thereby making electrode 1 the cathode and electrode 4 the anode.

In one embodiment, Al and Au were used as the electrodes and the junction area was about $4\times10^{-4}$ cm.$^2$. Although the description which follows will enable one to understand the operation of this device, further details on the physics of the ferromagnetic material are found in the article by the co-inventors of this application which appears in the publication Physical Review Letters, dated Oct. 9, 1967, volume 19, No. 15, pages 852 to 854. This publication is herewith incorporated, by reference, into this application.

A magnetic field $B_\perp$ is shown in FIG. 1 as being applied perpendicular to the current passing through the device. The magnetic field can be applied in any given direction, but a direction perpendicular to the tunneling current provides more conduction of current through the ferromagnetic material of the device of this invention. The magnetic field, preferably, has a range from about 0 to 20,000 oersteds.

Figure 2:
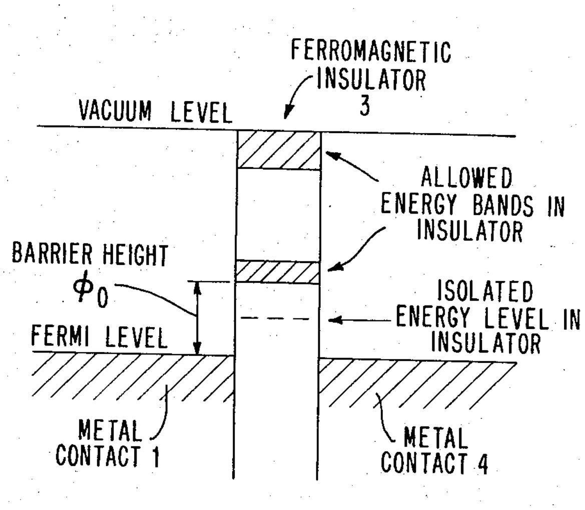
FIG. 2 is a diagrammatical view of the ferromagnetic device of FIG. 1 showing the Fermi levels of the two metal electrodes in relationship with the allowed energy bands and isolated energy level of the ferromagnetic insulating film located between the two metal electrodes.

Referring to FIG. 2, the Fermi levels in the metal electrodes 1 and 4 are shown with respect to the allowed energy bands and the isolated energy level in the ferromagnetic insulating film 3. This diagrammatical figure illustrates the conduction levels of the materials of this device prior to the application of an electric field or voltage from the battery.

Figure 3:
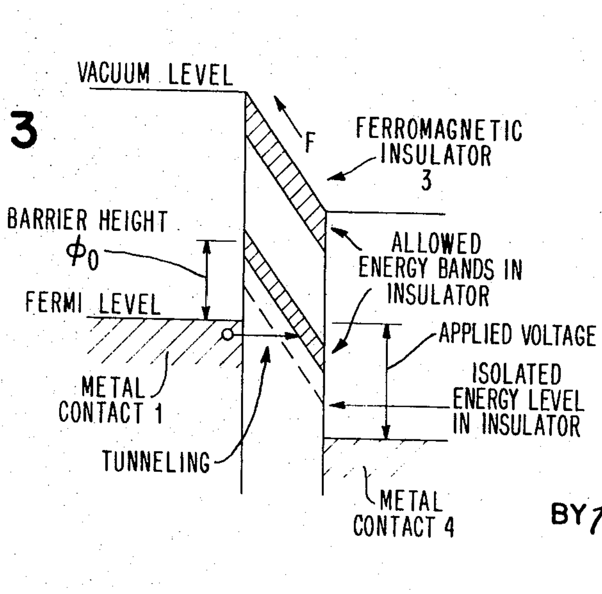
FIG. 3 is a diagrammatical view similar to FIG. 2 showing the change in the barrier for the ferromagnetic insulator and electron tunneling from the first metal electrode to the second metal electrode through the ferromagnetic insulating film at an applied voltage

Referring to FIG. 3, electron tunneling is shown between the first metal electrode or cathode 1 and the second metal electrode or anode 4 at an applied voltage. The applied magnetic field serves to alter the barrier height of the ferromagnetic insulator thereby enhancing tunneling action. The tunneling of the electrons is limited by the metal-insulator barrier height $\phi_0$ at the interface between the cathode electrode 1 and the ferromagnetic layer 3. The tunneling current is approximated by the Fowler-Nordheim tunneling formulas. Hence, by applying the magnetic field, a considerable reduction of the barrier height at the metal-insulator barrier at the cathode is achieved. In an example where EuSe was used as the thin magnetic insulator, which material has a transition temperature of 4.7° K., the tunneling current was measured at electric fields of around $2\times10^6$ volts per centimeter or higher thereby verifying the Fowler-Nordheim tunneling current formula. The barrier height is approximately 0.5 to 1 electron volt depending the metal that is used as the electrode.

Figure 4:
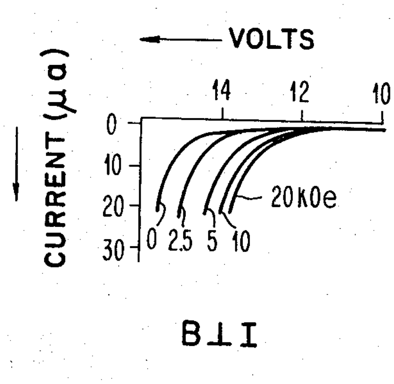
FIG. 4 is a graph showing a series of curves indicating the increase in current as a function of voltage for selected values of magnetic fields applied perpendicular to the current passing through the device.
Figure 5:
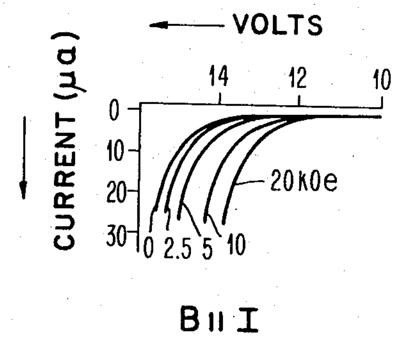
FIG. 5 is a graph showing a series of curves indicating the increase in current as a function of voltage for selected values of magnetic fields applied parallel to the current passing through the device.

Referring to FIGS. 4 and 5, respectively, magnetic fields from 0 to 20 koe. were applied perpendicular and parallel to the tunneling current I. The various curves in FIGS. 4 and 5 for the different applied magnetic fields at a temperature of about 4.2° K. clearly indicate the effect of the applied magnetic field on the current-voltage characteristics of the device of this invention. For example, the normal breakdown voltage of approximately 15 volts for this tunneling junction is reduced by as much as about two volts upon the application of a magnetic field of about 20 koe.

Referring to FIG. 5, the percentage changes of the barrier height $\Delta\Phi/\Phi$ (ordinate axis) when plotted with respect to the applied magnetic field (abscissa axis) for the cases when the magnetic field is applied perpendicular and parallel to the tunneling current is illustrated by the two curves shown in this figure. The barrier height $\Phi_0$ is considered to be the energy difference between Fermi level in the metal and the empty *5d* band in the ferromagnetic material such as EuSe. The position of the *5d* band is dependent on the spin ordering in *4f* electrons. Thus, the barrier height changes with changing magnetic fields. Hence, the value $\Delta\Phi$ reprsents the change in barrier height as dependent on the applied magnetic field. As seen by this figure, the greatest change in barrier height for a given magnetic field is when the field is applied perpendicular to the tunneling current. The other nonparallel directions of the magnetic field would be illustrated by curves intermediatethe two curves shown in this figure.

Figure 6:
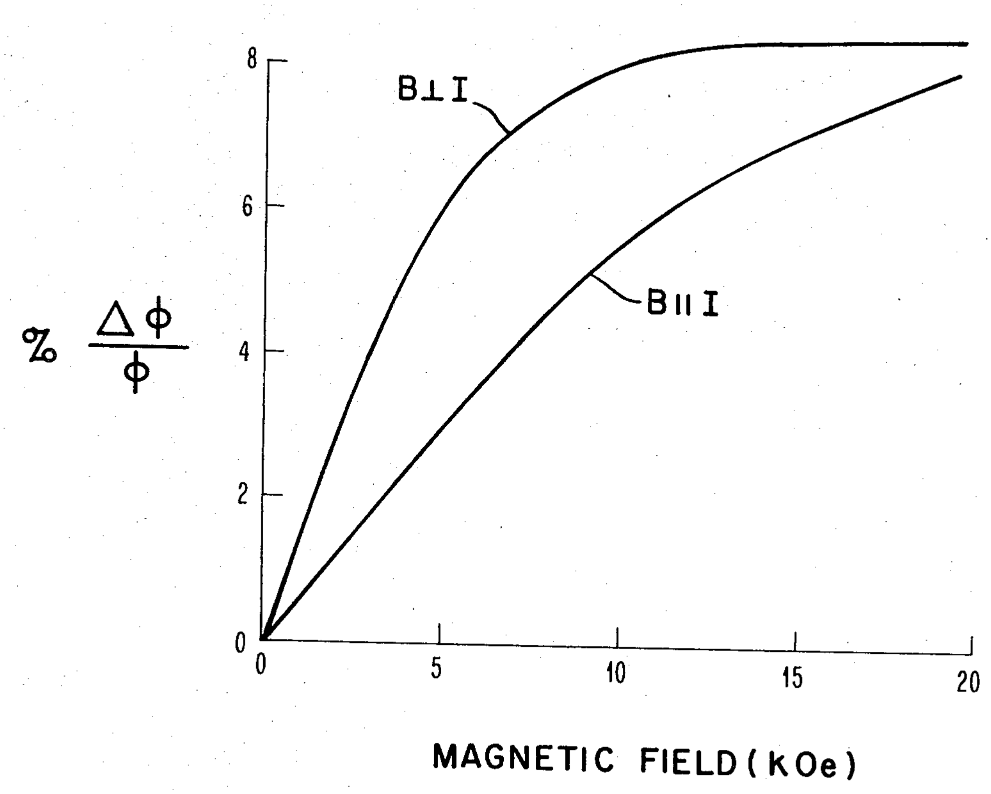
FIG. 6 is a graph showing the relationship between the percentage changes of the barrier height with respect to the applied magnetic field for the cases where the applied magnetic field is perpendicular to the tunneling current and where the applied magnetic field is parallel to the tunneling current.

In accordance with the principles of this invention, this ferromagnetic device is also useful for sensing either the magnitude or direction of a magnetic field applied to the device. For example, by using a suitable current detector or ammeter 7 in the circuit of FIG. 1, currents indicative of the magnitude of the applied magnetic field as well as the direction of the magnetic field are sensed (see FIG. 6 and FIGS. 4 and 5) thereby providing an apparatus for determining both the presence or direction of a magnetic field.

While the invention has been particularly shown and described with reference to a preferred embodiment thereof, it will be understood by those skilled in the art that various changes in form and details may be made therein without departing from the spirit and scope of the invention.

What is claimed is:

1. An electrical apparatus comprising, in combination; first and second metal conductors;

a ferromagnetic film located between and in contact with said first and second metal conductors, said film forming a potential barrier with at least one of said conductors and exhibiting electron tunneling upon application of a potential which reduces said barrier potential, said barrier potential being reducible upon application of a magnetic field to said film;

means for applying a magnetic field to said ferromagnetic film; and means for applying a positive potential to said first metal conductor and a negative potential to said second metal conductor.

2. An electrical apparatus in accordance with claim 1 wherein said ferromagnetic film being at least one europium chalcogenide selected from the group consisting of EuO, EuS, EuSe and EuTe.

3. An electrical apparatus in accordance with claim 2 wherein said ferromagnetic film is EuSe, said EuSe material having a thickness of about 50–2000 A.

4. An electrical apparatus in accordance with claim 3 wherein said EuSe material has a thickness of about 100–1000 A.

5. An electrical apparatus in accordance with claim 3 wherein the ferromagneitc material is EuS, said EuS material having a thickness of about 50–2000 A.

6. An electrical apparatus in accordance with claim 5 wherein said EuS material has a thickness of about 100–1000 A.

7. An electrical apparatus in accordance with claim 1 wherein said magnetic field is in the range of from 0–20,000 oresteds.

8. An electrical apparatus in accordance with claim 7 wherein said magnetic field is applied at any angle to the direction of electron flow through said device.

9. An electrical apparatus in accordance with claim 7 wherein said magnetic field is applied perpendicular to the direction of electron flow through said device.

10. An electrical apparatus in accordance with claim 8 wherein said ferromagneitc film is at least one europium chalcogenide selected from the group consisting of EuSe, EuO and EuS.

11. An elecrtical apparatus in accordance with claim 9 wherein said film is at least one europium chalcogenide selected from the group consisting of EuSe and EuS.

12. A magneitc field direction sensing and magnitude sensing apparatus comprising, in combination:

first and second metal conductors;

a ferromagnetic film located between and in contact with said first and second metal conductors, said film forming a potential barrier with at least one of said conductors and exhibiting electron tunneling upon application of a potential which reduces said barrier potential, said barrier potential being reducible upon application of a magnetic field to said film;

means for applying a positive potential to said first metal conductor and a negative potential to said second metal conductor; and means for sensing changes in the electron tunneling through said ferromagnetic film depending upon the magnitude and direction of said magnetic field.

13. A magnetic field direction sensing and magnitude sensing apparatus in accordance with claim 12 wherein said ferromagnetic film is at least one europium chalcogenide selected from the group consisting of EuO, EuS, EuSe and EuTe.

14. A magnetic field direction sensing and magnitude sensing apparatus in accordance with claim 13 wherein said ferromagnetic film is at least one of the group consisting of EuSe and EuS, said ferromagnetic material having a thickness of about 50–2000 A.

15. A magnetic field direction sensing and magnitude sensing apparatus in accordance with claim 14 wherein said ferromagnetic film has a thickness of about 100–1000 A.

References Cited

UNITED STATES PATENTS

| | | | |
|---|---|---|---|
| 2,922,730 | 1/1960 | Feldman | 317—234 X |
| 3,056,073 | 9/1962 | Mead | 317—234 |
| 3,259,759 | 7/1966 | Giaver | 317—234 X |
| 3,290,568 | 12/1966 | Hershinger | 317—235 |
| 3,398,301 | 8/1968 | Suzuki | 317—234 X |

JAMES D. KALLAM, Primary Examiner

U.S. Cl. X.R.

307—298; 317—234, 238